(12) United States Patent
Sharoyan et al.

(10) Patent No.: US 8,747,740 B2
(45) Date of Patent: Jun. 10, 2014

(54) PROCESS AND APPARATUS FOR GENERATING HALOAMINE BIOCIDE

(75) Inventors: David E. Sharoyan, Wilmington, DE (US); Huai N. Cheng, Avondale, PA (US); Michael J. Mayer, Jacksonville, FL (US); Freddie L. Singleton, Switzerland, FL (US)

(73) Assignee: Hercules Incorporated, Wilmington, DE (US)

( * ) Notice: Subject to any disclaimer, the term of this patent is extended or adjusted under 35 U.S.C. 154(b) by 1420 days.

(21) Appl. No.: 11/698,475

(22) Filed: Jan. 25, 2007
(Under 37 CFR 1.47)

(65) Prior Publication Data
US 2008/0181815 A1 Jul. 31, 2008

(51) Int. Cl.
*A61L 2/18* (2006.01)

(52) U.S. Cl.
USPC .............................. 422/37; 205/356; 205/359

(58) Field of Classification Search
USPC .................................... 422/37; 205/356, 359
See application file for complete search history.

(56) References Cited

U.S. PATENT DOCUMENTS

| | | | |
|---|---|---|---|
| 2,882,210 A | 4/1959 | Jenks | 204/151 |
| 3,776,825 A | 12/1973 | Vit et al. | |
| 5,976,386 A | 11/1999 | Barak | |
| 6,132,628 A | 10/2000 | Barak | |
| 6,222,071 B1 | 4/2001 | Delalu et al. | |
| 6,315,886 B1 | 11/2001 | Zappi et al. | |
| 6,328,875 B1 | 12/2001 | Zappi et al. | |
| 6,478,973 B1 | 11/2002 | Barak | |
| 2002/0139689 A1* | 10/2002 | Zolotarsky et al. | 205/342 |
| 2003/0221971 A1 | 12/2003 | Keister | |
| 2004/0035803 A1* | 2/2004 | Cronan et al. | 210/764 |
| 2007/0007145 A1 | 1/2007 | Simmons et al. | 205/357 |

FOREIGN PATENT DOCUMENTS

| | | |
|---|---|---|
| EP | 0 785 908 B1 | 1/2001 |
| EP | 1 293 482 A1 | 3/2003 |
| EP | 0 517 102 B1 | 6/2003 |
| GB | 532242 | 1/1941 |
| GB | 2368838 | 5/2002 |

OTHER PUBLICATIONS

Lyalin et al., "Developing Principles for an Electrochemical Low-Waste Production of Chloramines T, B, and KhB", 2000, Russion Journal of Electrochemistry, vol. 36 No. 11, pp. 1406-1416.*
C. Tremblay-Gouraudier, et al., "Monobromamine in Aqueous Solution. II. Stability and Formation by Electrolysis" J. Chim. Phys., 1994, vol. 91, pp. 535-546.
L. Peyrot, et al., "Elaboration of High-grade Chloramine from Ternary and Quarternary Ammoniacal Combinations and Hypochlorite at 100 Chlorometric Degrees," J. Chem. Research, 1999, pp. 358-359.

(Continued)

*Primary Examiner* — Michael Marcheschi
*Assistant Examiner* — Jonathan Hurst
(74) *Attorney, Agent, or Firm* — Michael J. Herman; Joanne Rossi

(57) ABSTRACT

Haloamine biocides are prepared via multi-step processes in an integrated apparatus comprising an electrochemical cell and a mixing chamber, wherein active halogen donor species are electrochemically generated and subsequently reacted with amine-containing compositions to form haloamine biocide. Haloamine biocides prepared according to such processes are used to treat liquids in order to inhibit, reduce, and/or control microorganism growth therein.

9 Claims, 3 Drawing Sheets

(56) References Cited

OTHER PUBLICATIONS

H. Delau, et al., "Synthesis of enriched solutions of chloramine starting from hypochlorite at high chlorometric degree," Chemical Engineering Journal, 2001, vol. 83, pp. 219-224.

B. V. Lyalin, et al., "An indirect method for the electrosynthesis of monochloroamine," Russian Chemical Bulletin, 1998, vol. 47, No. 10, pp. 1956-1959.

S. I. Agadzhanyan, et al., "Characteristics of the Composition of Ammonium Chloride Solutions Subjected to Electrolysis," Translated from Zhurnal Prikladnoi Khimii, vol. 64, No. 8, pp. 1615-1620, Aug. 1991.

N. Krstajic, et al., "Hypochlorite production II. Direct electrolysis in a cell divided by an anionic membrane," Journal of Applied Electrochemistry, 1991, vol. 21, pp. 637-641.

C. Tremblay, et al., "Formation of mono N-chloramine by electrolysis of ammonium chloride in aqueous ammoniacal solutions," J. Chim. Phys., 1993, vol. 90, pp. 78-89.

J-S Do, et al., "In situ paired electrooxidative degradation of formaldehyde with electrogenerated hydrogen peroxide and hypochlorite ion," Journal of Applied Electrochemistry, 1998, vol. 28, pp. 703-710.

A. Kraft, et al., "Electrochemical water disinfecton. Part II: Hypchlorite production from potable water, chlorine consumption and the problem of calcareous deposits," Journal of Applied Electrochemistry, 1999, vol. 29; pp. 895-902.

J. Beck, et al., "Preformed Monochloramine Used as a Post-Disinfectant in Drinking Water Treatment at Sjaelso Water Works," Aqua, 1986, pp. 25-33.

G. Holzwarth, et al., "The Fate of Chlorine and Chloramines in Cooling Towers: Henry's Law Constants for Flashoff," Water. Res., 1984, vol. 18, No. 11, pp. 1421-1427.

L. R. Czarnetzki, et al., "Formation of hypochlorite, chlorate and oxygen during NaCl electrolysis from alkaline solutions at an $RuO_2/TiO_2$ anode," Journal of Applied Electrochemistry, 1992, vol. 22, pp. 315-324.

C. Belmont, et al., "Coplanar interdigitated band electrodes for electrosynthesis: Part 4: Application to sea water electroysis," Electrochimica Acta, 1998, vol. 44, pp. 597-603.

A. Kraft, et al., "Electrochemical water disinfection Part I: Hypochlorite production from very dilute chloride solutions," Journal of Applied Electrochemistry, 1999, vol. 29, pp. 861-868.

S. Bharati, et al., "New bromine chemistry for effective VFA control, calalase control and biofilm elmination," Paper Asia, 2003, vol. 19, No. 7, pp.

C. Davis, et al., "Biocide Controls Microbes Without Adverse Impacts on Papermaking," Pulp & Paper, Feb. 2003.

G. Casini, "A novel bromine oxidizing technology for microbiological control," Paperi Ja Puu, 2003, vol. 85, No. 7.

\* cited by examiner

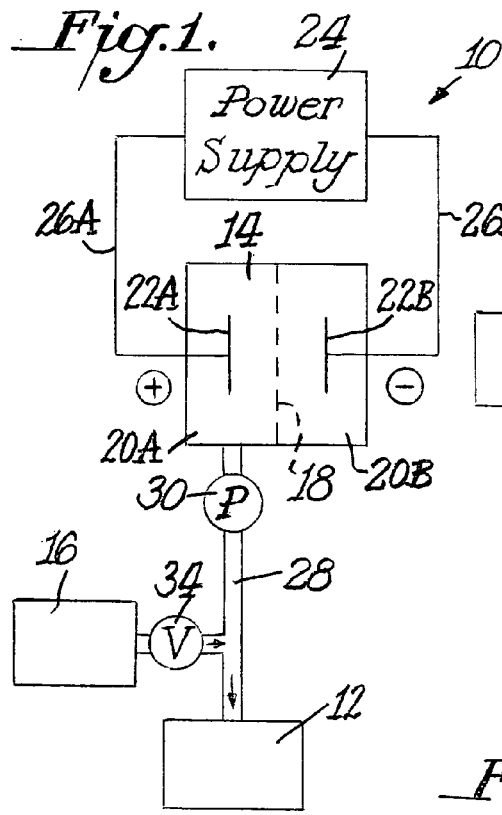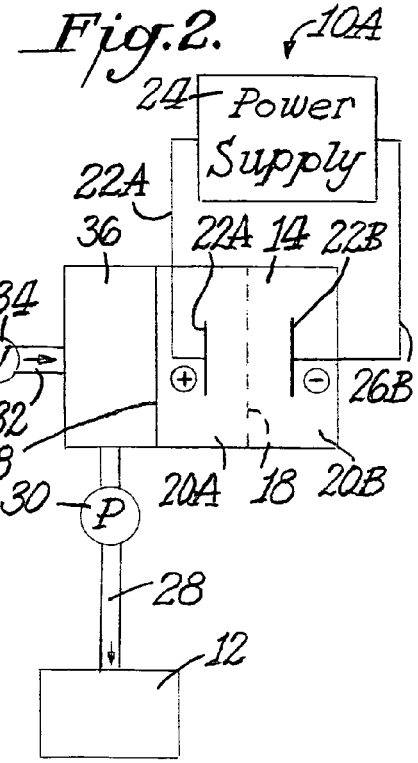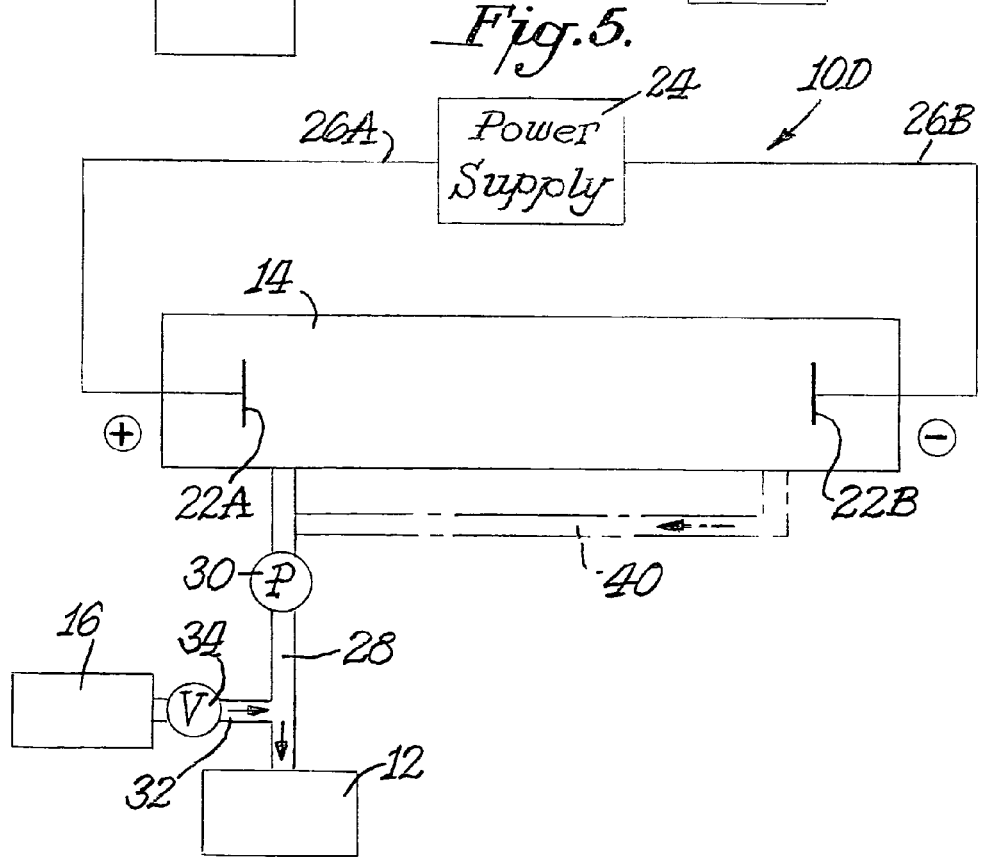

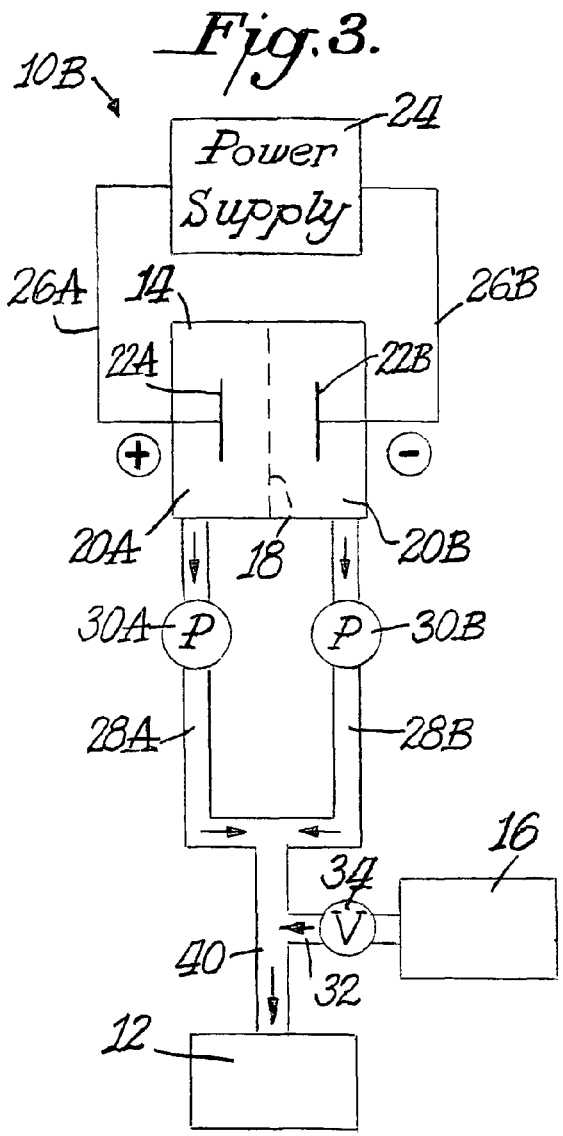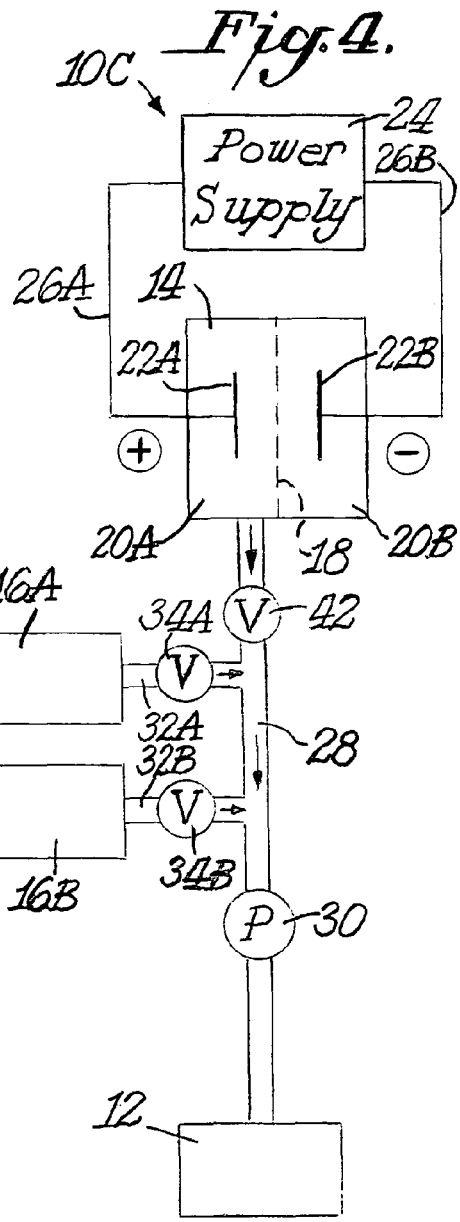

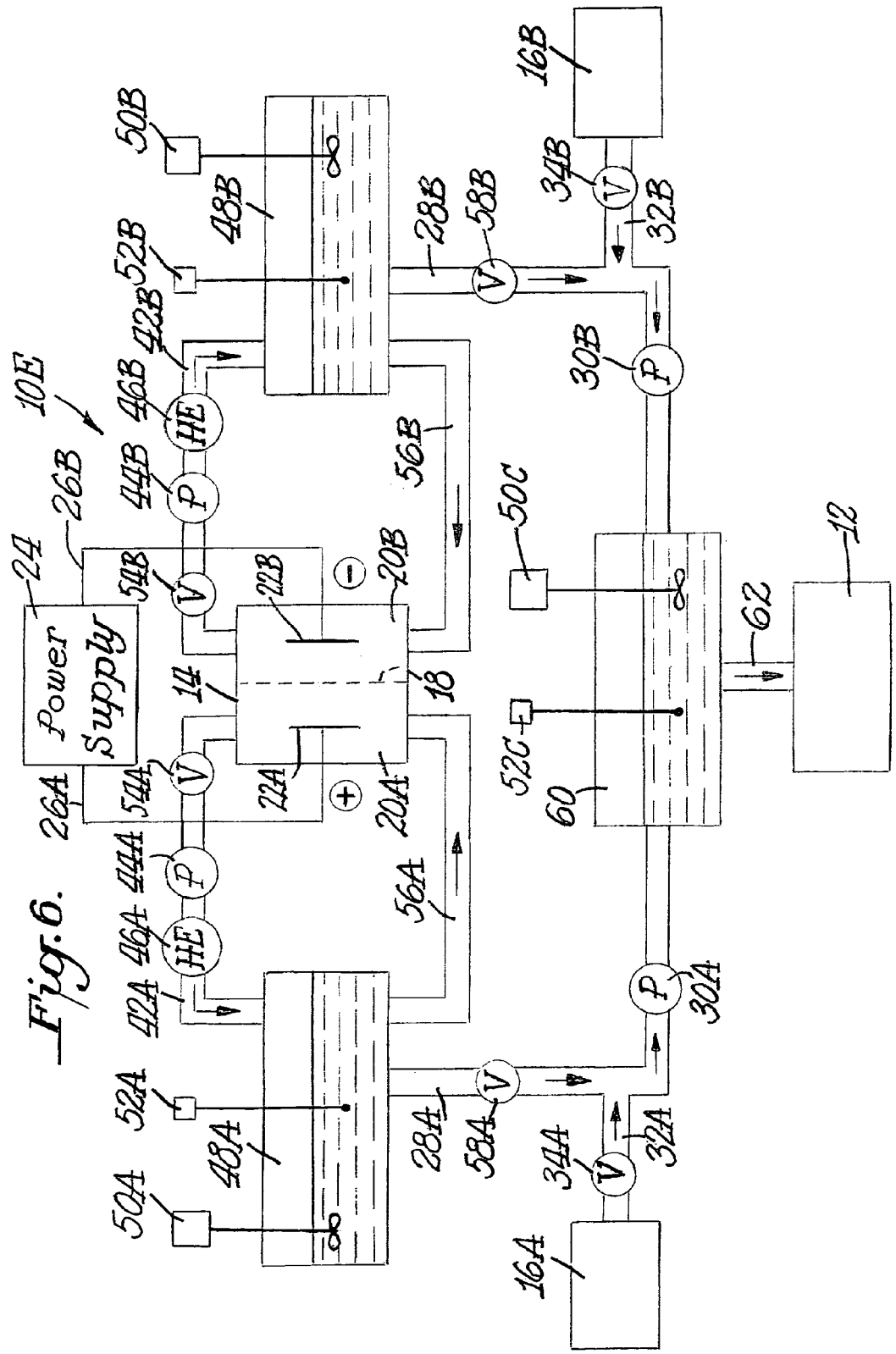

PROCESS AND APPARATUS FOR GENERATING HALOAMINE BIOCIDE

This invention is directed to (1) multi-step processes for preparing haloamine biocides in an integrated apparatus wherein active halogen donor species are electrochemically generated and subsequently reacted with amine-containing compositions to form haloamine biocide, (2) haloamine biocides prepared according to such processes, (3) integrated apparatuses for preparing haloamine biocides according to such processes, and (4) methods of treating liquids with haloamine biocide prepared according to such processes to inhibit, reduce, and/or control microorganism growth in the treated liquid.

BACKGROUND

Biological fouling of circulating water in paper and pulp applications is a well documented problem. Biological growth in circulating water can foul pipelines, accelerate corrosion, attack wood, decrease heat transfer, block filters, cause imperfections in paper sheets, decompose sizing mixtures, and cause other process interferences. Algae, fungi, bacteria and other microorganisms found in circulating water are the underlying cause of such fouling. Several factors contribute to biological fouling and govern its extent. These factors include water temperature, water pH, aerobic or anaerobic conditions, the presence or absence of light, and the presence or absence of inorganic and organic nutrients either from air drawn into the system or from materials naturally occurring in the water or continuously supplied during plant operation.

Haloamines are well known biocides which effectively reduce, inhibit and/or control the proliferation of microorganisms that cause biological fouling in circulating water. Haloamines biocides are typically generated by combining a solution of active halogen donor species (e.g., hypochlorite) with an amine-containing composition (e.g., an ammonium halide solution). For example, U.S. Pat. Nos. 5,976,386 and 6,132,628 to Barak disclose the preparation of haloamine biocides from hypochlorite and various ammonium salts for use in treating liquids to inhibit the growth of microorganisms. In these patents, the hypochlorite solution is not generated in situ in the disclosed apparatus, but is instead drawn from a reservoir of pre-existing solution These active halogen donor species, such as hypohalites, are strong, corrosive oxidants, making them both difficult and dangerous to handle, especially in large quantities. Furthermore, these species degrade over time, resulting in active halogen donor species solutions having decreased potency and efficacy.

According to the present invention, haloamine biocides for use in treating liquids to reduce, inhibit and/or control the proliferation of microorganisms are prepared using an integrated apparatus comprising an electrochemical cell and a mixing chamber wherein the active halogen donor species is electrochemically generated upon demand in the electrochemical cell and subsequently mixed with an amine-containing composition in the mixing chamber. Thus, the degradation, handling, transportation and safety problems are minimized, since reservoirs of active halogen donor species solutions do not have to be filled and maintained according to the present invention. Additional advantages of the present invention include the wide range of compositional diversity possible, process flexibility, enhanced process control, and generation and shut-off of haloamine upon demand. Also, persons skilled in the art will recognize that the processes of the present invention can be used for microbial control in applications other than paper and pulp, e.g., disinfection of swimming pools, municipal water treatment, food treatment, and pharmaceutical applications.

Haloamines have been electrochemically generated in one step in an electrochemical cell. See e.g., C. Trembley et al., *J. Chim. Phys.*, 90, 79 (1993) and C. Trembley et al., *J. Chim. Phys.*, 91, 535 (1994). In "An Indirect Method for the Electrosynthesis of Monochloroamine," B. V. Lyalin, et al., *Russian Chem. Bull.*, 47, 1956 (1998), attempts to electrochemically generate monochloroamine ($NH_2Cl$) in one step from ammonia in aqueous halide salt solution resulted in yields not exceeding 0.1%. Lyalin also discloses a two-step preparation of $NH_2Cl$ in only 50% overall yield. A solution of $NCl_3$ in carbon tetrachloride is electrochemically generated from $NH_4Cl$ in one apparatus. This $NCl_3$ solution is then mixed with ammonia in a second apparatus to generate $NH_2Cl$. U.S. Pat. No. 3,776,825 to Jaroslav discloses aqueous monohaloamine solutions generated in an electrochemical cell charged with a halide salt solution and an amine containing compound for use in dental applications. Active halogen donor species are electrochemically generated and converted to hypohalite by introducing hydroxide. The hypohalite reacts in situ with the amine containing compound to form monohaloamine. None of the above references disclose a process for preparing haloamine biocide using an integrated apparatus comprising an electrochemical cell and a mixing chamber wherein the active halogen donor species is electrochemically generated upon demand.

EMBODIMENTS OF THE INVENTION

The present invention relates to a process for preparing haloamine biocide in an integrated apparatus comprising an electrochemical cell and a mixing chamber, comprising the steps of (a) charging the electrochemical cell with a solution comprising halide salt; (b) electrochemically generating at least one active halogen donor species in the electrochemical cell; and (c) combining the at least one active halogen donor species with at least one amine-containing composition in said mixing chamber; wherein at least a portion of the at least one active halogen donor species reacts with at least a portion of the at least one amine-containing composition to form haloamine biocide.

Another embodiment is the process of the present invention wherein the at least one active halogen donor species comprises hypochlorite, hypochlorous acid, or any combination thereof.

Another embodiment is the process of the present invention wherein the at least one active halogen donor species comprises hypobromite, hypobromous acid, or any combination thereof.

Another embodiment is the process of the present invention wherein the at least one amine-containing composition comprises at least one ammonium salt.

Another embodiment is the process of the present invention wherein the at least one amine-containing composition is selected from the group consisting of ammonia, ammonium hydroxide, ammonium sulfate, ammonium carbonate, ammonium phosphate, ammonium nitrate, ammonium halide, or combinations thereof.

Another embodiment is the process of the present invention wherein the at least one amine-containing composition is selected from the group consisting of hydrazine, hydroxylamine, alkyl hydrazine, alkyl hydroxylamine, aryl hydrazine, aryl hydroxylamine, or combinations thereof.

Another embodiment is the process of the present invention wherein the at least one amine-containing composition comprises at least one organic amine.

Another embodiment is the process of the present invention wherein the at least one organic amine is selected from the group consisting of dialkylhydantoin, cyanuric acid, isocyanuric acid, ethylene diamine, ethanolamine, diethylene triamine, piperidine, glucosamine, acetamide, formamide, methanesulfonamide, urea, succinimide, taurine, sulfamic acid, β-alanine, glucuronamide, amino acids, and combinations thereof.

Another embodiment is the process of the present invention wherein the at least one amine-containing composition comprises at least one polymeric amine.

Another embodiment is the process of the present invention wherein the amine-containing composition comprises an inorganic amine source and wherein the at least one active halogen donor species and the amine-containing composition are each present in a concentration of about 0.01 to 1.0% by weight.

Another embodiment is the process of the present invention wherein the amine-containing composition comprises an inorganic amine source and the pH is in the range from about 9.0 to about 11.0.

Another embodiment is the process of the present invention wherein the electrochemical cell is divided and comprises an anode chamber and a cathode chamber, wherein the anode chamber is separated from a mixing chamber via an openable partition comprising an anion-permeable membrane; and wherein step (c) is achieved by (i) opening the openable partition for a time-period sufficient to allow the concentration of the at least one active halogen donor species to equalize between the anode chamber and the mixing chamber; (ii) closing the openable partition; and (iii) transferring an amine-containing composition to the mixing chamber.

Another embodiment is the process of the present invention wherein the electrochemical cell is divided and comprises an anode chamber and a cathode chamber, wherein each chamber is connected to a first and second conduit, respectively, wherein the first conduit acts as a mixing chamber and wherein step (c) is achieved by (i) transferring the at least one active halogen donor species from the anode chamber as a stream via the first conduit; (ii) transferring electrochemically generated hydroxide from the cathode chamber as a stream via the second conduit; (iii) merging the stream of (ii) with a stream of at least one amine-containing composition; and (iv) merging the stream of (iii) with the stream of (i).

Another embodiment is the process of the present invention wherein the electrochemical cell is divided and comprises an anode chamber and a cathode chamber, wherein the anode chamber is connected to a conduit that acts as a mixing chamber and wherein step (c) is achieved by (i) transferring the at least one active halogen donor species from the anode chamber as a stream via the conduit; and (ii) merging the stream of (i) with a stream of at least one amine-containing composition Another embodiment is the process of the present invention wherein the at least one amine-containing composition is ammonia at a pH of about 2 or lower and wherein the process further comprises an additional step (d) of merging the stream of (ii) with a stream comprising ammonia solution at a pH of about 7 or higher.

Another embodiment is the process of the present invention wherein the at least one amine-containing composition is ammonia at a pH of about 10.5 and wherein the process further comprises an additional step (d) of merging the stream of (ii) with a stream comprising sodium halide solution at a pH of about 10.5.

Another embodiment is the process of the present invention wherein the at least one amine-containing composition is an organic amine at a pH of about 10.5 and wherein the process further comprises an additional step (d) of merging the stream of (ii) with a stream comprising sodium halide solution at a pH of about 10.5.

Another embodiment is the process of the present invention wherein the electrochemical cell is undivided and comprises an anode and cathode located in the cell at a distance from each other sufficient to minimize degradation of the active halogen donor species, wherein a conduit that acts as a mixing chamber is connected to the cell at point proximate to the anode, and wherein step (c) is achieved by (i) transferring the at least one active halogen donor species from the cell as a stream via the conduit; and (ii) merging the stream of (i) with a stream of at least one amine-containing composition.

Yet another embodiment of the present invention is an integrated apparatus for preparing haloamine biocide comprising (a) an electrochemical cell comprising an anode and a cathode, wherein said cell is divided by a semipermeable membrane situated between said anode and cathode to form an anode chamber and a cathode chamber, (b) a mixing chamber, and (c) a power supply connected to said anode and cathode.

Yet another embodiment of the present invention is a method of treating a liquid comprising the step of adding haloamine biocide prepared according to the above processes to said liquid in an amount effective to reduce, control and/or inhibit the growth of microorganisms therein.

BRIEF DESCRIPTION OF THE DRAWINGS

A more complete understanding of the present description may be derived by referring to the various exemplary embodiments which are described in conjunction with the appended drawing figures in which like numerals denote like elements, and in which:

FIG. 1 depicts a block diagram illustrating an exemplary embodiment of an integrated apparatus for preparing haloamine biocide in accordance with the present invention;

FIG. 2 depicts a block diagram illustrating an exemplary embodiment of an integrated apparatus for preparing haloamine biocide in accordance with the present invention;

FIG. 3 depicts a block diagram illustrating an exemplary embodiment of an integrated apparatus for preparing haloamine biocide in accordance with the present invention;

FIG. 4 depicts a block diagram illustrating an exemplary embodiment of an integrated apparatus for preparing haloamine biocide in accordance with the present invention;

FIG. 5 depicts a block diagram illustrating an exemplary embodiment of an integrated apparatus for preparing haloamine biocide in accordance with the present invention;

FIG. 6 depicts a block diagram illustrating an exemplary embodiment of an integrated apparatus for preparing haloamine biocide in accordance with the present invention.

DESCRIPTION

One aspect of the present invention is directed to multi-step processes for preparing haloamine biocides using an integrated apparatus. As used herein and unless otherwise stated, (1) a "haloamine" is a chemical compound that contains one or more "N—X" bonds, wherein X is chlorine, bromine or iodine, and (2) a "biocide" is an agent added to a liquid to decrease the activity and number count of microorganisms contained therein. By decreasing the activity and number count of microorganisms in the treated liquid, inhibition, reduction, and/or control of microorganism growth in the liquid is achieved.

The multi-step processes of the present invention for preparing haloamine biocides are performed in an integrated apparatus comprising an electrochemical cell and a mixing chamber and comprises the steps of (1) charging the electrochemical cell with a solution comprising halide salt; (2) electrochemically generating at least one active halogen donor species in the electrochemical cell; and (3) combining the at least one active halogen donor species with at least one amine-containing composition in the mixing chamber; wherein at least a portion of the at least one active halogen donor species reacts with at least a portion of the at least one amine-containing composition to form haloamine biocide.

Any halide salt or any combination thereof can be used in the above processes. As used herein and unless otherwise stated, a "halide salt" is a salt wherein the negative counterion (i.e., anion) is chloride, bromide or iodide. Preferably, the halide salt comprises an alkali metal halide salt, an alkaline earth metal halide salt, or any combination thereof. More preferably, the halide salt comprises lithium halide, sodium halide, potassium halide, magnesium halide, calcium halide, or any combination thereof. Most preferably, the halide salt is sodium chloride, sodium bromide, or any combination thereof. Furthermore, a cheap and plentiful source of halide salt solution that may be used in the processes of the present invention is seawater.

Active halogen donor species are electrochemically generated when an electric current is passed through the electrochemical cell after being charged with a solution comprising halide salt. Unless otherwise stated herein, the terms "active halogen donor species" and "halogen donor" are used interchangeably and have the same meaning throughout the specification. As used herein and unless otherwise stated, the terms "electrochemical" and "electrochemically" are defined as the use of electrical voltage and current to effect a chemical transformation. The following reaction can occur when a solution comprising a halide salt is subjected to an electric current in an electrochemical cell:

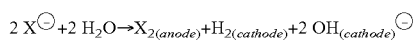

wherein X is Cl, Br or I. Once generated, $X_2$ may subsequently react as follows:

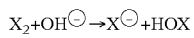

These reactions are illustrative and do not in any way limit the present invention. Halogen donors according to the present invention include, but are not limited to, $X_2$, HOX and $OX^-$, wherein X equals Cl, Br, or I. Parameters that affect the exact reactions that occur in a given electrochemical cell include, but are not limited to, cell design, electrode type, voltage, current, reagent concentration, temperature, and pH. Halogen donor yield is dependent on nature of electrode material (e.g., HOCl yield is enhanced through the use of ruthenium dioxide-coated titanium electrodes). The degree of HOX dissociation to $OX^-$ and $H^+$ is pH dependent. For the present invention, the at least one active halogen donor species preferably comprises at least one hypohalite, at least one hypohalous acid, or any combination thereof. Hypohalites may be hypochlorite, hypobromite, hypoiodite, or any combination thereof. Hypohalous acids may be hypochlorous acid, hypobromous acid, hypoiodous acid, or any combination thereof. More preferably, the at least one active halogen donor species comprises hypochlorite, hypochlorous acid, hypobromite, hypobromous acid, or any combination thereof. These halogen donors can be electrochemically generated upon demand in continuous mode (e.g., through a pipe or flow tube), batch mode or semi-batch mode (e.g., periodically via injections into the amine source).

The amine-containing compositions of the present invention comprise at least one inorganic amine source, at least one organic amine source, at least one polymeric amine source or any combination thereof. As used herein and unless otherwise stated, an "amine source" is defined as any compound containing at least one $-NH_2$ or $-NH-$ group. Preferably, the amine-containing compositions comprise solutions of at least one inorganic amine source, at least one organic amine source, at least one polymeric amine source, or any combination thereof. More preferably, the amine-containing compositions comprise aqueous solutions of at least one inorganic amine source, at least one organic amine source, at least one polymeric amine source, or any combination thereof.

Inorganic amine sources that may be used in the processes of the present invention include, but are not limited to, ammonia; ammonium hydroxide; hydrazine; hydroxylamine; ammonium salts, such as ammonium fluoride, ammonium chloride, ammonium bromide, ammonium iodide, ammonium carbonate, ammonium sulfate, ammonium phosphate, and ammonium nitrate; or any combination thereof. Ammonia, ammonium bromide, ammonium chloride and ammonium sulfate are preferred inorganic amines sources.

Organic amine sources that may be used in the processes of the present invention include, but are not limited to, dialkylhydantoin, wherein the alkyl groups are $C_1$ to $C_{10}$ straight chain, branched or cyclic alkyl groups, preferably dimethylhydantoin; cyanuric acid; isocyanuric acid; ethylenediamine; diethylene triamine; triethylene tetraamine; ethanolamine; piperidine; glucosamine; acetamide; formamide; methanesulfonamide; urea; succinimide; taurine; sulfamic acid; β-alanine; glucuronamide; alkyl hydrazines, wherein the alkyl groups are $C_1$ to $C_{10}$ straight chain, branched or cyclic alkyl groups; aryl hydrazines, preferably phenylhydrazine; alkyl hydroxylamines, wherein the alkyl groups are $C_1$ to $C_{10}$ straight chain, branched or cyclic alkyl groups; aryl hydroxylamines, preferably phenylhydroxylamine; and amino acids, preferably glycine, lysine, glutamine, asparagine and bistidine; or any combination thereof.

Polymeric amine sources that may be used in the processes of the present invention include, but are not limited to, polyamines, poly(vinylamine), poly(ethyleneimine), poly(diethylene triamine adipate), chitosan, and chitin; or any combination thereof. The polymeric amine sources can be of any molecular weight as long as they are water soluble.

Once electrochemically generated, the at least one active halogen donor species is combined with at least one amine-containing composition in the mixing chamber in any manner and by any means known to persons skilled in the art that results in at least a portion of the active halogen donor species reacting with at least a portion of the amine-containing composition to form haloamine biocide.

In one example, an apparatus which comprises a divided electrochemical cell comprising an anode chamber and a cathode chamber, wherein the anode chamber is separated from a mixing chamber via an openable partition which preferably comprises an anion permeable membrane. In this apparatus, the mixing chamber is charged with the same halide salt solution used to charge the electrochemical cell. The halogen donor and amine-containing composition are combined by (1) opening the openable partition for a time-period sufficient to allow the concentration of the halogen donor to equalize between the anode chamber and the mixing chamber, (2) closing the openable partition; and (3) transferring an amine-containing composition to the mixing chamber, whereupon at least a portion of the halogen donor reacts with at least a portion of the amine-containing composition to form haloamine biocide.

Optionally in the above example, the mixing chamber may be charged with a solution of at least one amine-containing composition at basic pH instead of the same halide salt solution used to charge the electrochemical cell. Once the desired concentration of electrochemically generated hypohalite is reached, the openable partition is opened, while leaving the anion-permeable membrane in place between the anode and mixing chambers. Being anionic, at least a portion of hypohalite will migrate through the membrane to the mixing chamber and react with at least a portion of the at least one amine-containing composition to produce haloamine biocide. Haloamine biocide is electrically neutral and will remain in the mixing chamber while the partition is open. Once the reaction is complete, the partition is closed and the haloamine biocide is removed as a stream via a conduit connected to the mixing chamber.

In another example, an apparatus is used which comprises a divided electrochemical cell comprising an anode chamber and a cathode chamber, wherein the anode chamber is connected to a conduit for the removal of halogen donor solution, the cathode chamber is connected to a conduit for the removal of electrochemically generated hydroxide solution and the anode chamber conduit also acts as a mixing chamber. The halogen donor and amine-containing composition are combined by (1) transferring the halogen donor solution as a stream from the anode chamber via the connected conduit, (2) transferring the hydroxide solution as a stream from the cathode chamber via the connected conduit, (3) merging the hydroxide solution stream with a stream of at least one amine-containing composition to form a stream of at least one amine-containing composition at elevated pH, and (4) merging the stream of (3) with the stream of (1), whereupon at least a portion of the halogen donor reacts with at least a portion of the amine-containing composition to form haloamine biocide.

In another example, an apparatus is used which comprises a divided electrochemical cell comprising an anode chamber and a cathode chamber, wherein the anode chamber is connected to a conduit for the removal of halogen donor solution and wherein the conduit also acts as a mixing chamber. The halogen donor and amine-containing composition are combined by (1) transferring the halogen donor solution as a stream from the anode chamber via the connected conduit and (2) merging the halogen donor stream with a stream of at least one amine-containing composition, whereupon at least a portion of the halogen donor reacts with at least a portion of the amine-containing composition to form haloamine biocide.

Optionally, this example can further comprise the additional step of merging the resulting stream of haloamine biocide with a stream comprising a second amine-containing composition or solution comprising halide salt. For example, to generate chloramine, a stream of chlorine donor solution is merged with a solution stream comprising ammonia at a pH of about 2 or lower. The resulting stream of trichloroamine solution is subsequently merged with a stream comprising ammonia solution at a pH of about 7 or higher to generate monochloroamine. As another example, a stream of halogen donor solution is merged with a stream of amine-containing composition comprising ammonia or an organic amine at a pH of about 10.5, followed by merging the resulting stream of haloamine biocide with a stream comprising sodium halide solution at a pH of about 10.5. The sodium halide is preferably sodium bromide or sodium iodide.

In another embodiment, an apparatus is used which comprises an undivided electrochemical cell comprising an anode and cathode located in the cell at a distance from each other sufficient to minimize degradation of the halogen donor, wherein a conduit for the removal of halogen donor solution is connected to the cell at point proximate to the anode and wherein the conduit also acts as a mixing chamber. The halogen donor and amine-containing composition are combined by (1) transferring the halogen donor solution as a stream from the cell via the connected conduit (2) merging the halogen donor solution stream with a stream of amine-containing composition, whereupon at least a portion of the halogen donor reacts with at least a portion of the amine-containing composition to form haloamine biocide. This embodiment is especially advantageous for using seawater as the halide salt solution. The pH of the hypochlorite solution should be adjusted before mixing with the amine-containing composition.

In all of the above processes, solution flow from the electrochemical cell, the anode chamber and the cathode chamber can be periodic or continuous.

The reaction of hypohalite with an amine-containing component to form haloamine biocide may be illustrated as follows:

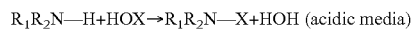

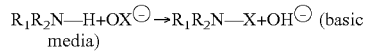

wherein
X=Cl, Br, or I
$R_1$=X, H or an organic moiety
$R_2$=X, H or an organic moiety According to the processes of the present invention, halogen donors are used at solution concentrations of about 0.01 to about 10.0, preferably about 0.01 to about 1.0% by weight as active halogen (i.e., molecular halogen, hypohalous acid, or hypohalite) based on the total weight of the entire solution subjected to electrolysis in the electrochemical cell. Likewise, the at least one amine-containing compositions are used at solution concentrations of about 0.01 to about 10.0, preferably about 0.01 to about 1.0, % by weight of amine source based on the total weight of the amine-containing composition. Solution concentrations of about 0.01 to about 1.0% for both the halogen donor and amine-containing composition are preferred when the amine-containing composition comprises an inorganic amine source. Solution concentrations of about 0.01 to about 10.0% for both the halogen donor and amine-containing composition are preferred when the amine-containing composition comprises an organic amine source.

Concentrations of haloamine biocide generated will differ depending on their type and also on the temperature and pH of the resulting solution. For example, chloramine is stable at concentrations up to about 1,000 ppm at pH of about 10 to about 11. At higher concentrations or lower pH, chloramine will partially decompose. Chloramine is typically used at a concentration in the range of 1 to 1000 ppm, preferably 1 to 20 ppm to treat liquids. Other haloamine biocides, such as those prepared from an organic amine source, are usually more stable at both acidic and basic pH and can be prepared at concentration levels of 10,000 ppm or higher.

Haloamine biocide prepared from an inorganic amine source is preferably prepared and maintained at a pH in the range of about 7.0 to about 11.0, more preferably at a pH in the range of about 9.0 to about 11.0, and most preferably at a pH in the range of about 10.5 to about 11.0, before being added to the liquid to be treated. Haloamine biocide prepared from an organic amine source is preferably prepared and maintained at a pH in the range of about 2.0 to about 11.0, more preferably at a pH in the range of about 5.0 to about 9.0, and most preferably at a pH in the range of about 6.0 to about 7.0, before being added to the liquid to be treated.

Higher temperatures accelerate decomposition of haloamine biocides. Thus, it is recommended that halogen donors be electrochemically generated at temperatures from about 0° C. to about 25° C. Cooling of the electrochemical cell can be achieved by any means known to persons skilled in the art, such as ice baths for small scale cells and heat exchangers for larger scale cells.

Another aspect of the present invention is directed to haloamine biocides prepared according to the process of the present invention. When the halogen is chlorine, the haloamine biocide is properly described as a chloramine biocide. When the halogen is bromine, the haloamine biocide is properly described as a bromamine biocide. When the halogen is iodine, the haloamine biocide is properly described as an iodamine biocide.

Haloamine biocides prepared according to the process of the present invention may be polymeric or non-polymeric. Non-polymeric haloamine biocides generally have a structure of formula (I):

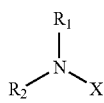

wherein

X=Cl, Br, or I $R_1$=X, H or an organic moiety $R_2$=X, H or an organic moiety (I)

Examples of organic moieties include, but are not limited to, the following:

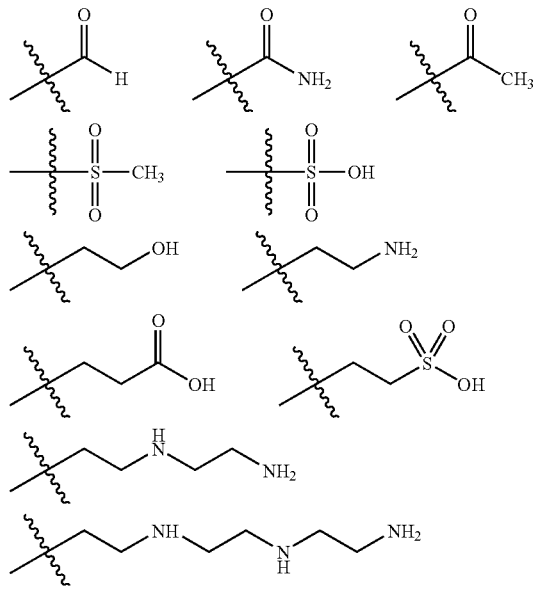

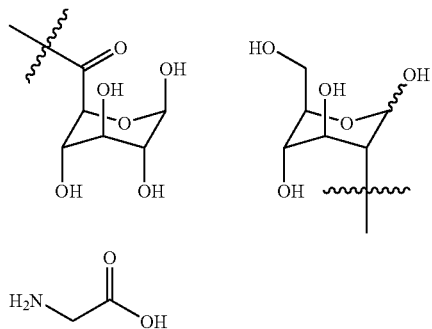

Optionally, when $R_1$ is —$CH_2CH_2NH_2$, $R_2$ may be —$CH_2CH_2NH_2$ or —$CH_2CH_2NHCH_2CH_2NH_2$ in addition to X or H. Furthermore, the nitrogen radical of the haloamine biocides prepared according to the process of the present invention may optionally be part of a heterocyclic ring comprising a total of five or more radicals. Examples of cyclic haloamine biocides include, but are not limited to, structures of formulae (II), (III), (IV), and (V):

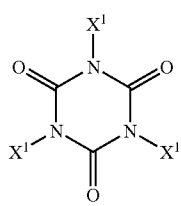
(II)

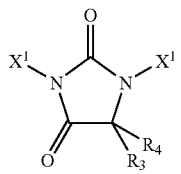
(III)

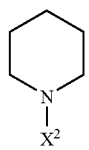
(IV)

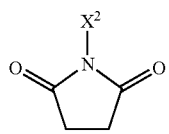
(V)

wherein $X^1$=Cl, Br, I, or H $X^2$=Cl, Br, or I $R_3$ and $R_4$=$C_1$ to $C_{10}$ alkyl group Examples of polymeric haloamine biocides include, but are not limited to, structures of formulae (VI), (VII), and (VIII):

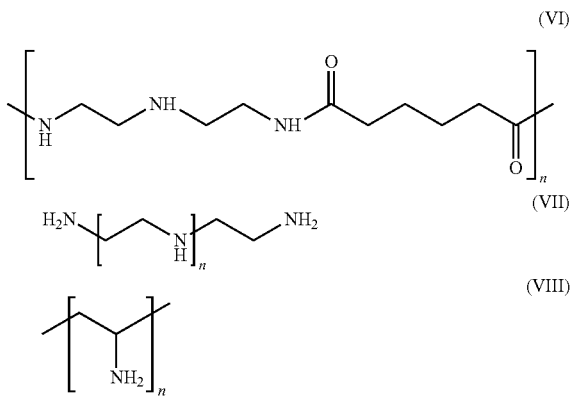

wherein n is equal to 10 to 400 for structures of formulae (VI) and 10 to 2000 for structures of formulae (VII) and (VIII).

Another aspect of the present invention is directed to apparatuses for preparing haloamine biocides according to the processes of the present invention. Such apparatuses comprise (1) an electrochemical cell for electrochemically generating a solution of active halogen donor species connected to (2) a mixing chamber for mixing the solution of electrochemically generated active halogen donor species with an amine-containing composition to generate haloamine biocide solution.

The electrochemical cells contain an anode and a cathode and may be constructed from materials such as glass and polymers such as polyethylene, polypropylene, poly(vinyl chloride), poly(vinylidene fluoride), poly(tetrafluoroethylene) and others. The cells may be divided or undivided. A divided cell has a separation made from a semi-permeable membrane located between the anode and the cathode that divides the interior of the cell into an anode chamber and a cathode chamber. Semi-permeable membranes made from Nafion are used to obtain halogen donor in higher yields and at higher current efficiency. In an undivided electrochemical cell, the anode and cathode are located at a distance from each other sufficient to minimize degradation of the halogen donor.

Optionally, a heat exchanger may be attached to the electrochemical cell to cool the solution therein. This is because electrolysis-generated heat may elevate the temperature of the halogen donor solution, resulting in some decomposition of the active halogen donor species.

Anodes may be constructed from titanium coated with ruthenium dioxide, reticulated vitreous carbon, graphite, platinum or other noble metals. Ruthenium dioxide coated titanium anodes are preferred from an efficiency and chemical standpoint.

Cathodes may be constructed from platinum, stainless steel, nickel, and other metals or alloys. Persons skilled in the art will recognize that electrodes, particularly anodes, having higher surface area, as well as effective solution mixing, will enhance efficiency and yield of electrochemical generation of halogen donors. The electrochemical cells optionally farther comprise devices for monitoring pH and temperature and for mixing, as well as for measuring the amount of the haloamine biocide present. The anodes and cathodes are connected to a power supply by wires made from any material that conducts an electrical current.

In batch and semi-batch applications, the mixing chamber may be (1) a separate chamber connected to the electrochemical cell or the anode chamber of the electrochemical cell via a conduit connected at one end to the cell or anode chamber of the cell and at the other end to the mixing chamber or (2) directly attached to the electrochemical cell or the anode chamber of the electrochemical cell and separated by an openable partition. In batch and semi-batch mode, halogen donor solution is transferred from the electrochemical cell or the anode chamber of the electrochemical cell via the connecting conduit or by opening the openable partition into the mixing chamber for mixing with the amine-containing composition to generate haloamine biocide. Once generated, the solution of haloamine biocide is transferred via a conduit to the liquid to be treated.

In continuous flow applications, a conduit attached to the cell or anode chamber of the cell for transfer of halogen donor solution also operates as the mixing chamber. In continuous mode, solution of halogen donor is transferred from the electrochemical cell into the conduit, where it is mixed with amine-containing composition to generate a stream of haloamine biocide solution. This stream of haloamine biocide solution is transferred via the conduit to the liquid to be treated.

Amine-containing composition is injected into the mixing chamber from one or more reservoirs connected to the mixing chamber via one or more conduits. The stream flow rate of the amine-containing composition may be controlled by a valve attached to the conduit. In batch or semi-batch mode applications, the amine-containing composition may be injected into the mixing chamber before, after, or simultaneously with the transfer of the halogen donor into the mixing chamber. In continuous mode application, the amine-containing composition is injected into the conduit while a stream of halogen donor solution is passing through the conduit.

The mixing chambers above may further comprise devices for monitoring pH, temperature and mixing, as well as for measuring haloamine biocide concentration.

Pumps may be connected to the conduits to transfer the halogen donor solution from the cell into the conduit. Optionally, a heat exchanger may be attached to the conduit at a point downstream from the pump to cool the solution stream. Such a pump may also be used to control stream flow rate through the conduit. However, a valve may optionally be attached to the conduit to control stream flow rate through the conduit.

FIG. 1, FIG. 2, FIG. 3, FIG. 4, and FIG. 5, are block diagrams illustrating apparatus embodiments for use in generating haloamine biocide according to the processes of the present invention. These Figures are not intended to limit the apparatuses of the present invention in any way.

The apparatuses 10, 10A, 10B, 10C, 10D, and 10E illustrated in FIG. 1, FIG. 2, FIG. 3, FIG. 4, FIG. 5, and FIG. 6, respectively, are for the purpose of treating a body of liquid (schematically indicated at 12 in each Figure), such as water used in pulp and paper applications, to reduce, control and/or inhibit the growth of microorganisms therein. This is achieved by adding to the liquid at location 12 in each Figure a haloamine biocide prepared by mixing in situ two solutions: (1) a solution of active halogen donor species electrochemically generated in electrochemical cell 14 in each Figure, and (2) a solution of at least one amine-containing composition contained in reservoir 16 in each Figure.

In FIG. 1, electrochemical cell 14 is charged with a solution comprising halide salt. Electrochemical cell 14 is divided by a semi-permeable membrane 18 into an anode chamber 20A, which contains an anode 22A, and a cathode chamber 20B, which contains a cathode 22B. Anode 22A and cathode 22B are connected to power supply 24 by wires 26A and 26B, respectively. Once electrochemical cell 14 is charged with the halide salt solution, a halogen donor solution is electrochemically generated by engaging power supply 24 so that an electric current is passed through electrochemical cell 14.

Once generated, the halogen donor solution is transferred as a stream from anode chamber 20A into conduit 28, to which pump 30 is attached. An amine-containing composition is transferred from reservoir 16 via conduit 32 into conduit 28. The stream flow rate of the amine-containing composition solution is controlled by valve 34. Once mixed in conduit 28, the halogen donor reacts with the amine-containing composition to form a stream of haloamine biocide solution. This stream is transferred into location 12 via conduit 28 to treat the liquid therein.

In apparatus 10A of FIG. 2, a halogen donor solution is electrochemically generated in electrochemical cell 14 in the same manner performed in apparatus 10 of FIG. 1. The anode chamber 20A of electrochemical cell 14 is connected to a mixing chamber 36. The anode chamber 20A and mixing chamber 36 are separated from each other by an openable partition 38 that optionally further comprises a semi-permeable membrane. This openable partition 38 is open when electrochemical cell 14 is charged with halide salt solution, so that the mixing chamber 36 is also charged with halide salt solution. Openable partition 38 is then closed prior to electrochemical generation of halogen donor in the anode chamber 20A. Once electrochemical generation of halogen donor is complete, openable partition 38 is opened for a time period sufficient to allow the halogen donor concentration to equilibrate between anode chamber 20A and mixing chamber 36.

Once the halogen donor concentration has equilibrated, haloamine biocide is generated in mixing chamber 36 by closing openable partition 36 and transferring amine-containing composition from reservoir 16 to mixing chamber 36 via conduit 32. The stream flow rate of amine-containing composition is controlled by valve 34 on conduit 32. Upon mixing, halogen donor reacts with amine-containing composition to form haloamine biocide solution. This solution is transferred as a stream from mixing chamber 36 into conduit 28, to which pump 30 is attached. The stream of haloamine biocide solution is transferred into location 12 via conduit 28 to treat the liquid therein.

In apparatus 10B of FIG. 3, a halogen donor solution is electrochemically generated in electrochemical cell 14 and transferred into conduit 28A in the same manner performed in apparatus 10 of FIG. 1. A solution comprising electrochemically generated hydroxide is transferred from cathode chamber 20B via conduit 28B, to which pump 30B is attached. Merger of the solution streams of conduits 28A and 28B into a single conduit 40 results in a halogen donor solution at elevated pH.

Haloamine biocide is generated in conduit 40 by transferring amine-containing composition from reservoir 16 into conduit 40 via conduit 32. The stream flow rate of amine-containing composition is controlled by a valve 34 on conduit 32. Upon mixing, halogen donor reacts with amine-containing composition to form a stream of haloamine biocide solution. This stream of haloamine biocide solution is transferred into location 12 via conduit 40 to treat the liquid therein.

In apparatus 10C of FIG. 4, a halogen donor solution is electrochemically generated in electrochemical cell 14 and transferred into conduit 28 in the same manner performed in apparatus 10 of FIG. 1. The stream flow rate in conduit 28 can be controlled by valve 42. A first haloamine biocide is generated by transferring a first amine-containing composition at acidic pH from reservoir 16A into conduit 28 via conduit 32A. The stream flow rate of first amine-containing composition is controlled by valve 34A on conduit 32A. Upon mixing, halogen donor reacts with first amine-containing composition to form a stream of first haloamine biocide solution. The stream of first haloamine biocide solution is then transferred downstream through conduit 28. A second haloamine biocide solution is then generated by transferring a second amine-containing composition at basic pH from reservoir 16B into conduit 28 via conduit 32B. The stream flow rate of second amine-containing composition is controlled by valve 34B on conduit 32B. Upon mixing, first haloamine biocide reacts with second amine-containing composition to form a stream of second haloamine biocide solution. This stream of haloamine biocide solution is transferred into location 12 via conduit 28 to treat the liquid therein.

In apparatus 10D of FIG. 5, electrochemical cell 14 is charged with a solution comprising halide salt. Electrochemical cell 14 is undivided and anode 22A and cathode 22B are placed at a distance from each other sufficient to minimize degradation of the electrochemically generated halogen donor at the cathode. Anode 22A and cathode 22B are connected to power supply 24 by wires 26A and 26B, respectively. Once electrochemical cell 14 is charged with solution comprising halide salt, a halogen donor solution is electrochemically generated by engaging power supply 24, so that an electric current is passed through electrochemical cell 14.

Once generated, the halogen donor solution is transferred as a stream into conduit 28, which is connected to electrochemical cell 14 at a point proximate to anode 22A. A pump 30 is attached to conduit 28. Haloamine biocide solution is generated by transferring amine-containing composition from reservoir 16 into conduit 28 via conduit 32. The stream flow rate of amine-containing composition is controlled by valve 34 on conduit 32. Upon mixing, halogen donor reacts with amine-containing composition to form a stream of haloamine biocide solution. The stream of haloamine biocide solution is transferred into location 12 via conduit 28 to treat the liquid therein. Optionally, a conduit 40 connected at one end to electrochemical cell 14 at a point proximate to cathode 22B can be used to transfer solution comprising hydroxide electrochemically generated at cathode 22B into conduit 28, where, upon mixing with the halogen donor solution, it elevates the pH of the solution.

Apparatus 10E of FIG. 6 can be used to prepare haloamine biocide by two different processes. In the first process, halogen donor solution is electrochemically generated in electrochemical cell 14 and transferred into conduit 42A in the same manner performed in apparatus 10 of FIG. 1. The stream of halogen donor solution from anode chamber 20A is transferred via conduit 42A, to which a pump 44A and heat exchanger 46A is attached, into reservoir 48A, which is equipped with a stirrer 50A to mix the solution and pH meter 52A to monitor pH. The stream flow rate in conduit 42A is controlled by valve 54A. The halogen donor solution in reservoir 48A is recycled back into anode chamber 20A via conduit 56A until the desired concentration halogen donor is achieved.

Once the desired concentration of halogen donor is achieved, the halogen donor solution in reservoir 48A is transferred as a stream into conduit 28A, to which pump 30A is attached. The stream flow rate from reservoir 48A is controlled by valve 58A. Haloamine biocide is generated by transferring a stream of amine-containing composition from reservoir 16A into conduit 28A via conduit 32A. The stream flow rate from reservoir 16A is controlled by valve 34A. Upon mixing, halogen donor reacts with amine-containing composition to form a stream of haloamine biocide solution. This stream of haloamine biocide solution is transferred via conduit 28A to reservoir 60, which is equipped with a stirrer 50C to mix the solution and pH meter 52C to monitor pH, where it is held until used. The haloamine biocide solution in reservoir 60 is transferred into location 12 via conduit 62 to treat the liquid therein.

In the second process, halogen donor solution is prepared as described in the first process above, but is instead transferred from reservoir 48A as a stream via conduit 28A to reservoir 60, which acts in this process as a mixing chamber. A solution comprising hydroxide is electrochemically generated in the cathode chamber 20B at the same time halogen donor is being electrochemically generated in anode chamber 20A. The solution comprising hydroxide is transferred from cathode chamber 20B via conduit 42B, to which a pump 44B and heat exchanger 46B is attached, into reservoir 48B, which is equipped with a stirrer 50B to mix the solution and pH meter 52B to monitor pH. The stream flow rate in conduit 42B is controlled by valve 54B. The solution comprising hydroxide in reservoir 48B is recycled back into cathode chamber 20B via conduit 56B until the desired concentration hydroxide is achieved.

Once the desired concentration of hydroxide is achieved, the solution comprising hydroxide in reservoir 48B is transferred as a stream into conduit 28B, to which pump 30B is attached. The stream flow rate from reservoir 48B is controlled by valve 58B. Amine-containing composition at elevated pH is generated by transferring a stream of amine-containing composition from reservoir 16B into conduit 28B via conduit 32B. The stream flow rate from reservoir 16B is controlled by valve 34B. This stream of amine-containing composition at elevated pH is transferred via conduit 28B to reservoir 60. The halogen donor in reservoir 60 reacts with amine-containing composition at elevated pH to form a haloamine biocide solution, where it is held until used. The haloamine biocide solution in reservoir 60 is transferred into location 12 via conduit 62 to treat the liquid therein.

Another aspect of the present invention is directed to a method of treating liquids with haloamine biocides prepared according to the processes of the present invention in order to reduce, control and/or inhibit the growth of microorganisms present in the liquid. This method of treatment comprises the step of adding haloamine biocide prepared according to the above processes to liquids in an amount effective to reduce, control and/or inhibit the growth of microorganisms therein. As used herein and unless otherwise stated, such "treatment" encompasses reducing, controlling and/or inhibiting growth of microorganisms; controlling and/or preventing biofouling; cleaning; disinfecting; purifying; and/or sterilizing. Thus, specific applications of the present method of treatment include: controlling and/or preventing biofouling of circulating waters; cleaning and/or disinfecting recreational waters, such as swimming pools; and purifying and sterilizing municipal waters. Preferably, the dose concentration of haloamine biocide used in treating paper mill whitewater is about 0.1 ppm to about 10 ppm. More preferably, the dose concentration of haloamine biocide for treating paper mill whitewater is about 0.5 ppm to about 2 ppm.

Microorganisms whose growth can be reduced, controlled and/or inhibited by this method of treatment include, but are not limited to, algae, fungi, bacteria and other simple life forms. Many genera and species of bacteria can be found in paper mill whitewater. The composition of the bacterial community in a paper mill whitewater system depends on many factors, such as the source of the water used to process the paper, temperature, pH, and additives used to make paper. Examples of bacteria commonly found in paper mill whitewater whose growth can be reduced, controlled and/or inhibited by the present method of treatment include, but are not limited to, *Klebsiella pneumonia*, *Pseudomonas aeruginosa*, *Curtobacterium flaccumfaciens*, *Burkholderia cepacia*, *Bacillus maroccanus*, and *Pseudomonas glathei*.

It is believed that persons skilled in the art can use the present invention to its fullest extent without further elaboration beyond the disclosure of the preceding description. Therefore, the following examples are to be construed as merely illustrative and not limitative of the invention in any way.

EXAMPLES

Electrochemical generation of active halogen donor species is carried out using equipment from BAS Analytical, including BAS Epsilon, PWR-3 power booster and electrolytic cell with 100 mL volume. Unless otherwise stated, titanium electrodes with special ruthenium dioxide coating ($RuO_2$/Ti) are used as the anode for electrochemical generation of active chlorine donor species. Unless otherwise stated, platinum gauze electrodes are used as the anode for electrochemical generation of active bromine donor species. A platinum coil is used as a cathode in all the Examples. A specially designed barrier made from Nafion membrane is placed between electrodes in divided electrochemical cells.

Electrochemical generation of active chlorine donor species is conducted at 2.0 V potential (relative to Ag/AgCl reference electrode where $E_{Ag/AgCl}$=0.196 V), as determined from cyclic voltammetry experiments. Electrochemical generation of active bromine donor species is conducted at 1.5 V potential, as determined from cyclic voltammetry experiments. A maximal current of 1.0 A is used for the majority of electrochemical generation of active halogen donor species runs.

Electrochemical generation of all active halogen donor species is carried out in an ice/water bath at 0° C. Unless otherwise stated, aliquots of anode chamber solution are removed every 30 minutes for 2 hours and then every 60 minutes for an additional 2 hours to determine concentration of active halogen donor species and pH. Haloamine concentrations are determined using a Hach test kit. Yields are calculated from the Hach readings. In some Examples, concentrations of haloamine species are confirmed by UV-VIS spectroscopy and iodometric titration.

Example 1

Monochloramine is prepared in batch mode in an integrated apparatus comprising (1) a divided electrochemical cell connected to a power supply, (2) a mixing chamber charged with 40 mL of 200 mmol/L aqueous ammonia solution at pH 12.7, and (3) a conduit connecting the anode chamber of the electrochemical cell to the mixing chamber. The electrochemical cell is charged with 100 mL of 1.0 M aqueous NaCl solution. 100 mL of 150 mmol/L aqueous solution of active chlorine donor species at a pH of 3.8 is electrochemically generated by passing an electric current through the cell. 40 mL of the active chlorine donor species solution is combined in bulk with the aqueous ammonia solution to form monochloramine by passing it from the anode chamber to the mixing chamber via the conduit. The monochloramine is produced in about 40% yield and at a solution concentration of about 2,150 ppm (30 mmol/L). The pH of the resulting monochloramine solution is 10.0. Some bubbling is observed during the reaction, which indicates partial decomposition. This is likely due to the limited solubility of chloramine in aqueous media. As a result, the HOCl solutions of Examples 2 and 3 are diluted.

Example 2

Monochloramine is prepared in batch mode in the same manner as Example 1. The electrochemically generated active chlorine donor species solution is diluted to about 1950 ppm (27.5 mmol/L) to form approximately 100 mL of diluted solution. This diluted solution is combined in bulk with 100 mL of 50 mmol/L aqueous ammonia solution at pH 12.70 by passing it from the anode chamber to the mixing chamber via the conduit. 200 mL of 12.8 mmol/L monochloramine solution is generated in 93% yield. The pH of the resulting monochloramine solution is 12.6.

Example 3

Monochloramine is prepared in continuous mode using the apparatus of FIG. 1. 100 mL of a 22.8 mmol/L aqueous solution of active chlorine donor species is generated in the same manner as Example 2. The pH of this diluted solution is 3.25. The diluted solution is transferred from the anode chamber via the connected conduit as a stream at a stream pressure of 25 mL/min and mixed with a stream of 100 mL of 50 mmol/L aqueous ammonia solution at pH 12.70 at a stream pressure of 25 mL/min. At this rate, mixing of the two streams takes approximately 4 minutes to complete. Monochloramine as a 9.5 mmol/L aqueous solution is generated in 83% yield. The pH of the resulting mixture changes from 12.15 to 12.65 during mixing.

Example 4

N-chloroethylenediamine is prepared in batch mode using the apparatus of Example 1. The divided electrochemical cell is charged with 100 mL of 1.0 M aqueous NaCl solution. 100 mL of an approximately 130 mmol/L (13,000 ppm) aqueous solution of active chlorine donor species at a pH of 3.8 is electrochemically generated by passing an electric current through the cell for one hour. The active chlorine donor species solution is transferred from the anode chamber via the connected conduit and combined in bulk with an equal volume of 0.5 M ethylenediamine solution contained in the connected mixing chamber, producing an approximately 77 mmol/L (5500 ppm) aqueous solution of N-chloroethylenediamine in 85% yield. The UV-VIS spectrum of a sample contains a band at 250 nm for chlorinated ethylenediamine species.

Example 5

Monochloramine is prepared in batch mode in an integrated apparatus comprising (1) a divided electrochemical cell connected to a power supply, (2) a mixing chamber, (3) a conduit connecting the anode chamber of the electrochemical cell to the mixing chamber, and (4) a conduit connecting the cathode chamber of the electrochemical cell to the mixing chamber. The divided electrochemical cell is charged with 100 mL of a 1.0M aqueous NaCl solution. 100 mL of a 150 mmol/L aqueous solution of active chlorine donor species at a pH 3.8 is electrochemically generated in the anode chamber and 3 mL of concentrated aqueous NaOH solution at a pH greater than 13 is electrochemically generated in the cathode chamber by passing an electric current through the cell. The respective solutions are transferred from the anode and cathode chambers via the connected conduits to the mixing chamber, where they are mixed to produce approximately 103 mL of an aqueous NaOCl solution at pH 12.45. This solution is then diluted to a concentration of approximately 25 mmol/L. The NaOCl solution is combined in bulk with an equal volume of a 50 mmol/L aqueous ammonia solution at pH 10.80, to produce an approximately 12.5 mmol/L aqueous solution of monochloramine in almost quantitative yield. The pH of the aqueous monochloramine solution is 12.10. The UV-VIS spectra of a sample contains a band at 245 nm for monochloramine.

Example 6

The process of Example 5 is performed in continuous mode using the apparatus of FIG. 3. 100 mL of a 25 mmol/L aqueous solution of active chlorine donor species is generated in the same manner as Example 5. The active chlorine donor species solution is removed from the anode chamber via the connected conduit as a stream at a stream pressure of 25 mL/min and mixed with a stream of 100 mL of 50 mmol/L aqueous ammonia solution at a stream pressure of 25 mL/min. At this rate, mixing of the two streams takes approximately 4 minutes to complete. The pH of the mixture changes from 12.17 to 12.37. 200 mL of monochloramine as an 11.4 mmol/L aqueous solution is produced by this process in 90% yield. The pH of the aqueous monochloramine solution is 12.35. The UV-VIS spectrum of a sample contains a band at 245 nm for monochloramine.

Example 7

The process of Example 5 is performed using aqueous NaBr solution as the halide source. The divided electrochemical cell is charged with 100 mL of a 0.5 M aqueous NaBr solution. Over the course of 1 hour, 100 mL of a 110 mmol/L aqueous solution of active bromine donor species at pH 8.0 is electrochemically generated in the anode chamber and about 3 mL of aqueous NaOH solution at a pH 11.0 is electrochemically generated in the cathode chamber, by passing an electric current through the cell. The respective solutions are transferred from the anode and cathode chambers via the connected conduits and mixed to produce an aqueous solution of predominantly NaOBr at pH 10.7. 100 mL of this aqueous NaOBr solution is combined in bulk with 100 mL of a 100 mmol/L aqueous ammonia solution at pH 12.60 contained in the mixing chamber. 200 mL of 1 mmol/L aqueous monobromamine solution is generated in 7% yield.

Example 8

Example 7 is repeated using diluted NaOBr solution. 100 mL of 25 mmol/L NaOBr solution is combined in bulk with a 20 fold excess of ammonia (100 mL, 500 mmol/L, pH 12.6) to produce monobromamine in 15% yield. The UV-VIS spectrum contains a band at 278 nm from monobromamine, $NH_2Br$.

Example 9

Monochloroamine is prepared in continuous mode using the apparatus of FIG. 4. The divided electrochemical cell is charged with 100 mL of 1.0 M aqueous NaCl solution. 100 mL of 170 mmol/L aqueous solution of active chlorine donor species having a pH of 4.00 is electrochemically generated by passing an electric current through the cell. 80 mL of this solution is transferred from the anode chamber via the connected conduit as a stream at a stream pressure of 25 ml/min and is mixed with a stream of 100 mL of 200 mmol/L acidified aqueous solution of NH₄Cl at pH 1.85 at a stream pressure of 25 mL/min to produce a 14 mmol/L aqueous solution of $NCl_3$ at pH 1.65 in approximately 50% yield. This stream of $NCl_3$ is subsequently mixed at a point further down the conduit with a stream of 200 mL of 100 mmol/L aqueous solution of $NH_3$ at pH 12.80, producing an aqueous solution of dichloroamine and monochloroamine. Monochloroamine is generated in 25% yield at a concentration of 8.5 mmol/L. The pH of the final solution is 10.50. Yields are significantly lower without strict pH control of the reaction conditions (i.e., $NH_4Cl$ solution maintained and added at low pH and $NH_3$ solution maintained and added at high pH). The UV-VIS spectra of samples from taken after $NH_4Cl$ solution addition contain bands at 220 and 340 nm, confirming the presence of $NCl_3$. The UV-VIS spectra of samples from taken after $NH_3$ solution addition contain bands at 245 nm, confirming the presence of monochloramine.

Example 10

Monochloroamine in a concentration of 17 mmol/L is produced in the same manner as described in Example 2 in almost quantitative yield, which is then subjected to six separate treatments of potassium iodide solution (addition of 0, 0.03, 0.09, 0.15, 0.50 and 1.00 mole equivalents of iodide relative to monochloroamine). In all additions except the first, yellow color from molecular iodine ion is observed. The UV-VIS spectra demonstrates the existence of both molecular iodine and monochloramine in the samples where little iodide is added (0.03 and 0.09 equivalents), whereas the samples with larger amounts of iodide (0.5 and 1.0 equivalents) contain predominantly molecular iodine (with UV bands at 288, 350, and 460 nm). Biocidal activity of the mixtures is lower than that of pure monochloramine.

Example 11

Example 10 is repeated, except that sodium bromide is added. Monochloroamine in a concentration of 17 mmol/L is produced in the same manner as described in Example 2 in almost quantitative yield, which is then subjected to five separate treatments of sodium bromide solution (addition of 0, 0.10, 0.25, 0.50 and 1.00 mole equivalents of sodium bromide). A UV-VIS band at 245 nm indicates that monochloroamine remains the major active component in the mixture. However, a band at 323 nm indicates a portion is converted into hypobromite and, in the last sample which turns yellow, into molecular bromine (band at 390 nm) and tribromide (band at 262 nm). Biocidal activity of the mixtures with bromide is lower than that of pure chloramine.

The invention claimed is:

1. A process for preparing haloamine biocide in an integrated apparatus comprising an undivided electrochemical cell and a mixing chamber, wherein the cell comprises an anode and a cathode located in the cell at a distance from each other sufficient to minimize degradation of an active halogen donor species, wherein a first conduit that acts as the mixing chamber is connected to the cell at point proximate the anode, and wherein a second conduit having a first and second end is connected to the cell at the first end at a point proximate the cathode and to the first conduit at the second end, the process comprising the steps of:

(a) charging the electrochemical cell with a solution comprising halide salt;
(b) electrochemically generating at least one active halogen donor species in the electrochemical cell at the anode, and electrochemically generating hydroxide in the electrochemical cell at the cathode at temperature in the range of from about 0° C. to about 25° C.;
(c) transferring a solution of the electrochemically generated hydroxide from the cathode through the second conduit to mix with a solution of the at least one active halogen donor species in the first conduit prior to mixing with an at least one amine-containing composition, where upon mixing the pH of the solution of the at least one active halogen donor species is increased; and
(d) combining the at least one active halogen donor species with the at least one amine-containing composition in the mixing chamber, wherein the combining is achieved by:
(i) transferring the at least one active halogen donor species as a stream via the first conduit after the transferring of step (c); and
(ii) merging the stream of (i) with the stream of at least one amine-containing composition; wherein at least a portion of the at least one active halogen donor species reacts with at least a portion of the at least one amine-containing composition to form haloamine biocide and wherein a yield of a resulting monohaloamine is at least 80% provided that the at least one active halogen donor species comprises hypochlorite, hypochlorous acid, hypobromite, hypobromous acid or any combination thereof.

2. The process of claim 1 wherein the at least one amine-containing composition comprises at least one ammonium salt.

3. The process of claim 1 wherein the at least one amine-containing composition is selected from the group consisting of ammonia, ammonium hydroxide, ammonium sulfate, ammonium carbonate, ammonium phosphate, ammonium nitrate, ammonium halide, or combinations thereof.

4. The process of claim 1 wherein the at least one amine-containing composition is selected from the group consisting of hydrazine, hydroxylamine, alkyl hydrazine, alkyl hydroxylamine, aryl hydrazine, aryl hydroxylamine, or combinations thereof.

5. The process of claim 1 wherein the at least one amine-containing composition comprises at least one organic amine.

6. The process of claim 5 wherein the at least one organic amine is selected from the group consisting of dialkylhydantoin, cyanuric acid, isocyanuric acid, ethylene diamine, ethanolamine, diethylene triamine, piperidine, glucosamine, acetamide, formamide, methanesulfonamide, urea, succinimide, taurine, sulfamic acid, β-alanine, glucuronamide, amino acids, and combinations thereof.

7. The process of claim 1 wherein the at least one amine-containing composition comprises at least one polymeric amine.

8. The process of claim 1 wherein the at least one amine-containing composition comprises an inorganic amine source and wherein the at least one active halogen donor species and the at least one amine-containing composition are each present in a concentration of about 0.01 to 1.0% by weight.

9. The process of claim 1 wherein the at least one amine-containing composition comprises an inorganic amine source and the pH is in the range from about 9.0 to about 11.0.

* * * * *